United States Patent [19]

Ernsting et al.

[11] E Re. 31,424

[45] Reissued Oct. 25, 1983

[54] RESPIRATORS

[75] Inventors: John Ernsting, Fleet, England; Thomas R. Morgan, Graniteville, S.C.; Leonard F. W. Palmer, Seaton, England; Alfred J. Rivers, Church Crookham, England; Stephen M. Robson, High Wycombe, England

[73] Assignees: The Secretary of State for Defence in Her Britannic Majesty's Government of the United Kingdom of Great Britain and Northern Ireland, by said Ernsting, Palmer, River, and Robson; The United States of America as represented by the Secretary of the Air Force, Washington, D.C. ; by said Morgan

[21] Appl. No.: 437,766

[22] Filed: Oct. 27, 1982

Related U.S. Patent Documents

Reissue of:

[64] Patent No.: 4,294,243
Issued: Oct. 13, 1981
Appl. No.: 967,122
Filed: Dec. 8, 1978

[30] Foreign Application Priority Data

Dec. 9, 1977 [GB] United Kingdom ..... 51378/77

[51] Int. Cl.[3] ..... A62B 7/00

[52] U.S. Cl. ..... 128/201.18; 128/201.23; 128/206.21

[58] Field of Search ..... 128/201.18, 201.23, 128/201.27, 205.25, 207.11, 206.12, 206.17, 201.24, 201.25

[56] References Cited

U.S. PATENT DOCUMENTS

| | | | |
|---|---|---|---|
| 1,978,994 | 10/1934 | Fortunato | 128/201.18 |
| 3,438,060 | 4/1969 | Lobelle et al. | 128/201.23 |
| 4,077,068 | 3/1978 | Anderson | 128/207.11 |
| 4,090,511 | 5/1978 | Gray | 128/201.18 |

FOREIGN PATENT DOCUMENTS

| | | | |
|---|---|---|---|
| 891655 | 10/1953 | Fed. Rep. of Germany | 128/201.18 |
| 754529 | 4/1954 | Fed. Rep. of Germany | 128/201.18 |
| 1222570 | 10/1968 | United Kingdom | 128/201.18. |

*Primary Examiner*—Henry J. Recla
*Attorney, Agent, or Firm*—Donald J. Singer; Thomas L. Kundert

[57] ABSTRACT

The invention provides a nose occlusion facility on respirators of the type in which a hood and visor combination envelops the head of a wearer and carries an oronasal mask for supplying respiratory gas to the wearer. The nose occlusion facility is manually operable and comprises a lever device mounted on the exterior of the visor and associated with arms operative to pinch the wearer's nose in the region of the lobes thereof.

8 Claims, 2 Drawing Figures

RESPIRATORS

Matter enclosed in heavy brackets [ ] appears in the original patent but forms no part of this reissue specification; matter printed in italics indicates the additions made by reissue.

The present invention relates to headgear to be worn by personnel for protection against unpleasant or toxic substances in their local atmosphere, such as radioactive, chemical and/or bacterial substances. As it is fundamental to such headgear that safe breathing supplies are maintained, headgear in accordance with the invention are hereinafter called respirators.

Co-pending UK patent application No. 20135/76 describes a respirator for protection against undesirable substances in a local atmosphere and which comprises a hood and a visor both made of material impervious to the undesirable substance, attached one to another in a manner impervious to the undesirable substance and adapted to fit and envelop closely the head of a wearer, means for permitting a wearer to breathe acceptable air and/or oxygen, means for maintaining a gas pressure within the respirator greater than local environmental pressure, and seal means for preventing atmosphere outside thereof from reaching the interior of the respirator via the neck aperture thereof.

The primary utility of such respirators is in the protection of aircrew, particularly military aircrew, and it is a feature of that invention, and indeed of the invention the subject of the co-pending UK Patent Specification 47129/77, that such respirators may be used at all altitudes. Now a significant proportion of aircrew find it necessary to unblock their ears during change of altitude by occluding their noses. The present invention provides on a respirator of the type described in co-pending patent application No. 20135/76 means whereby a user may occlude his nose.

According to the present invention, a respirator of the type comprising a hood and visor combination for closely enveloping the head of a user and an oronasal mask contained or formed within the hood for delivering breathable gas to the user's nose and mouth, has manually operable nose occluding means including force transmission means penetrating the hood/visor combination, manipulable handle means associated with the transmission means outside the hood/visor combination and nose impingement means associated with the transmission means and within the hood/visor combination, the arrangement being such that in use manual operation of the handle means can bring about the impingement on the user's nose and occlusion thereof by the impingement means.

In a preferred embodiment of the invention the handle means is located on a nasal region of the visor, the transmission means comprises a pair of pivots, and the impingement means comprises a yoke arranged to swing down onto the sides of the oronasal mask and to pinch it onto the nose. The arms of the yoke may carry rollers rotatable thereon to facilitate a swinging and pinching operation.

In another embodiment of the invention the handle means is located on the respirator in the region of a hood cavity gas supply inlet, and the nose impingement means comprises a pair of cranks fitted within the mask and the arms whereof are operable in use to swivel one toward the other and pinch the user's nose. The transmission means may comprise an arm/pin linkage or cable, cord, or chain means perhaps with an associated spring for urging the impingement means into a non-impingement configuration.

In yet another embodiment of the invention the transmission means comprise a Bowden cable and the handle means a caliper device.

The impingement means are preferably readily adjustable so that a user can arrange them to occlude his own nose in optimum fashion. For this purpose the impingement yoke or arms may be readily detachable, bendable, and/or carry adjustable pads.

Where the transmission means, or any other part of the impingement apparatus, penetrates the respirator, seals may be included to prevent entry thereby of undesirable substances.

The occlusion means are particularly readily mountable on respirators the visors whereof are constituted by a member forming an exoskeleton for covering substantially the whole of a user's face.

A respirator nose occlusion facility in accordance with the invention will now be described by way of example with reference to the accompanying drawings, of which:

Figure 1:
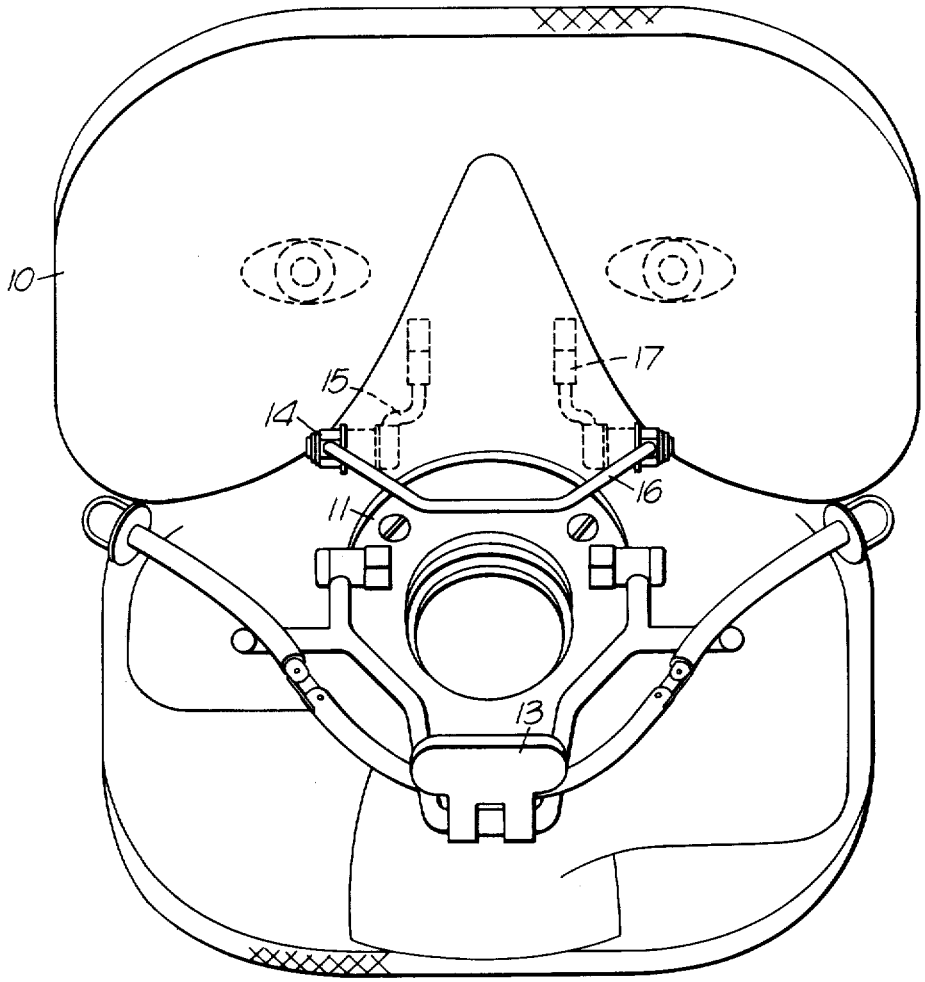
FIG. 1 is a front elevation of a respirator visor carrying a nose occluder.

Illustrated in the drawings is a visor 10 to a respirator of the type described in co-pending UK patent application No. 20135/76. As can be seen the visor is a substantially rigid member formed to cover substantially the whole face of a wearer. It is transparent at least in the region ahead of the eyes and forms an exoskeleton to the respirator as a whole. It carried, attached at a face plate 11, an oro-nasal mask 12 formed to cover the nose and mouth of a wearer. The mask 12 is made of a flexible rubber material. Clamping means 13, also attached at the face plate 11 serve, in consort with an anchorage on say an aircrewman's helmet, to urge the mask 12, via the visor 10, to seal against the face of the wearer around the nose and mouth.

The nose occlusion facility is mounted on the visor 10 in a nasal region thereof. It comprises a pair of pivots 14 penetrating the visor nasal region on a common lateral axis, a pair of yoke arms 15 mounted on and projecting radially from the pivots 14 inside the visor 10, and a substantially V-shaped handle 16 attached to both pivots 14 outside the visor. The arms 15 carry right cylindrical beads 17 rotatable thereon. The pivots 14 are sealed to the visor.

In a non-engaged configuration the arms 15 project toward the top edge of the visor 10 and the handle 16 rests against the top of the face plate 11. This configuration is as illustrated in FIG. 1.

Figure 2:
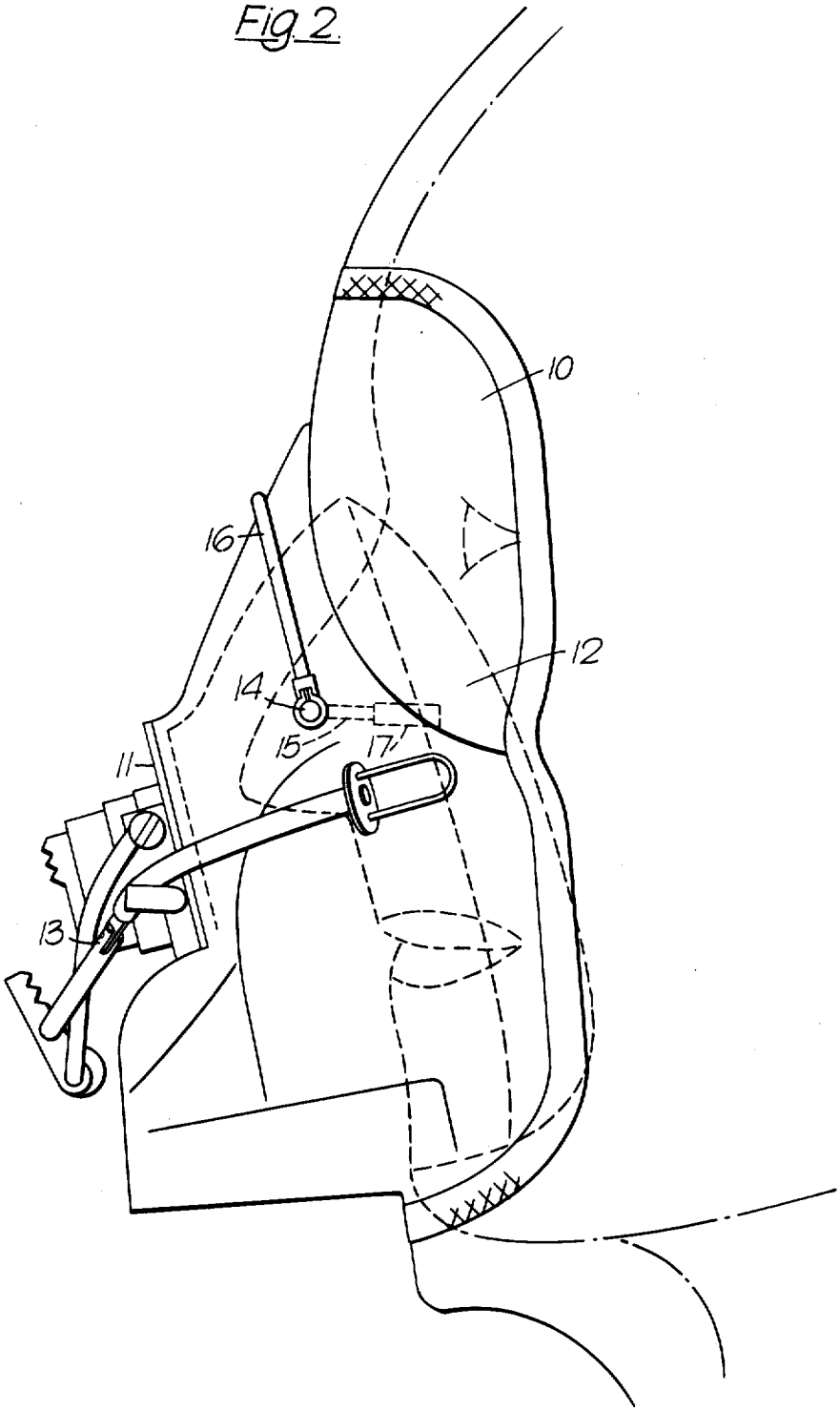
FIG. 2 is a side elevation of the respirator shown in FIG. 1.

To operate the occluder the handle 16 is lifted, rotating the pivot and bringing the arms 15 to bear on the sides of the nose portion of the mask 12, so that they pinch the lobes of the wearer's nose. This operative configuration is as illustrated in FIG. 2.

The arms 15 are made of a manually pliable metal so that an individual wearer may bend them to maximise the efficiency of their operation with respect to his own nose.

We claim:

1. An oro-nasal respirator, comprising:

a. a visor;

b. a mask carried by said visor, said mask having a shape adapted to cover the nose and mouth of the wearer;

c. means for providing respiratory gas to the wearer through said mask;

d. means attached to said mask for selectively occluding the wearer's nose; said last mentioned means including a pair of spaced apart pivots penetrating through said mask in the nasal region thereof; yoke arms extending radially from said pivots on the inside of said mask; a handle secured to said pivots on the outside of said mask; said handle operable to rotate said pivots and cause said yoke arms to turn into the sides of the wearer's nose.

2. The device of claim 1 wherein said yoke arms have cylindrical bead members rotatably mounted thereon.

3. The device of claim 1 wherein said visor includes a transparent portion adapted to cover the eyes of the wearer.

4. The device of claim 1 wherein said yoke arms are made of a manually pliable metal.

5. The device of claim 1 wherein said mask includes adjustable means for urging the mask in sealing engagement with the face of the wearer around the nose and mouth.

6. The device of claim 1 wherein said pivots are sealed to the mask.

7. The device of claim 1 wherein said mask is made of flexible rubber material.

8. The device of claim 1 wherein said spaced apart pivots lie on a common lateral axis and said yoke arms rotate in a direction generally perpendicular to said axis.

* * * * *